United States Patent
Ho

[11] Patent Number: 5,934,775
[45] Date of Patent: Aug. 10, 1999

[54] QUICK RELEASE TERMINAL HOLDER MOUNTING ARRANGEMENT FOR A COMPUTER

[76] Inventor: Hsin Chien Ho, 20F-1, 268, Sec.1, Wen-Hua Rd., Pan Chiao City, Taipei, Taiwan

[21] Appl. No.: 09/140,695

[22] Filed: Aug. 26, 1998

[51] Int. Cl.⁶ .................................................. A47B 88/00
[52] U.S. Cl. .................. 312/223.2; 361/683; 361/825
[58] Field of Search .............................. 312/223.1, 223.2; 361/683, 725, 727, 731, 732, 733, 847, 848, 823, 825, 681, 682

[56] References Cited

U.S. PATENT DOCUMENTS

| | | | |
|---|---|---|---|
| 4,903,167 | 2/1990 | Lichtensperger | 361/759 |
| 5,466,059 | 11/1995 | Liu | 312/223.2 |
| 5,503,472 | 4/1996 | Vu et al. | 312/223.2 |
| 5,590,023 | 12/1996 | Hernandez et al. | 361/683 |
| 5,650,911 | 7/1997 | Scholder et al. | 361/683 |
| 5,742,003 | 4/1998 | Ho | 361/825 |

*Primary Examiner*—Peter M. Cuomo
*Assistant Examiner*—Gerald A. Anderson
*Attorney, Agent, or Firm*—Dougherty & Troxell

[57] ABSTRACT

A terminal holder mounting arrangement includes a terminal holder supported on an open frame at the upright rear side wall of the casing of a computer and detachably secured in place by hooks and retaining elements inside the casing, the terminal holder having a top flange forced into engagement with the hooks at the casing, and an oblique bottom flange moved over the retaining elements at the casing and retained in place by the retaining elements. The terminal holder is disengaged from the constraint of the hooks and the retainer elements when a rigid pin is inserted into a bottom hole in the casing to push the bottom flange of the terminal holder away from the retainer elements.

4 Claims, 3 Drawing Sheets

QUICK RELEASE TERMINAL HOLDER MOUNTING ARRANGEMENT FOR A COMPUTER

BACKGROUND OF THE INVENTION

The present invention relates to a quick release terminal holder mounting arrangement for a computer which can be quickly disconnected from the casing of the computer for a replacement.

The casing of a computer is provided with a front panel at the front side to hold diskdrive, CD-ROM player, etc., and a plurality of terminal slots at the upright rear side wall thereof for holding a variety of terminals, so that a variety of computer peripheral apparatus including monitor, speaker, printer, keyboard, mouse, scanner, etc., can be connected to the computer through the terminals in the terminal slots. Alternatively, a terminal holder which has a set of terminal slots for holding different terminals may be welded to the casing at the rear side. Because the number and shapes of the terminal slots are not changeable, the whole assembly of the casing fits only a particular model of master board. For matching with a different master board, a different design of casing may be needed.

SUMMARY OF THE INVENTION

The present invention provides a quick release terminal holder mounting arrangement which enables the user to install a replaceable terminal holder in a computer housing quickly. According to one aspect of the present invention, the terminal holder mounting arrangement comprises a terminal holder supported on an open frame at the upright rear side wall of the casing of a computer and detachably secured in place by hooks and retaining elements inside the casing, the terminal holder having a top flange forced into engagement with the hooks at the casing, and an oblique bottom flange moved over the retaining elements at the casing and retained in place by the retaining elements. According to another aspect of the present invention, the terminal holder can easily be disengaged from the constraint of the hooks and the retainer elements for a replacement by inserting a rigid pin into a bottom hole in the casing to push the bottom flange of the terminal holder away from the retainer elements.

DETAILED DESCRIPTION OF THE PREFERRED EMBODIMENT

Figure 1:
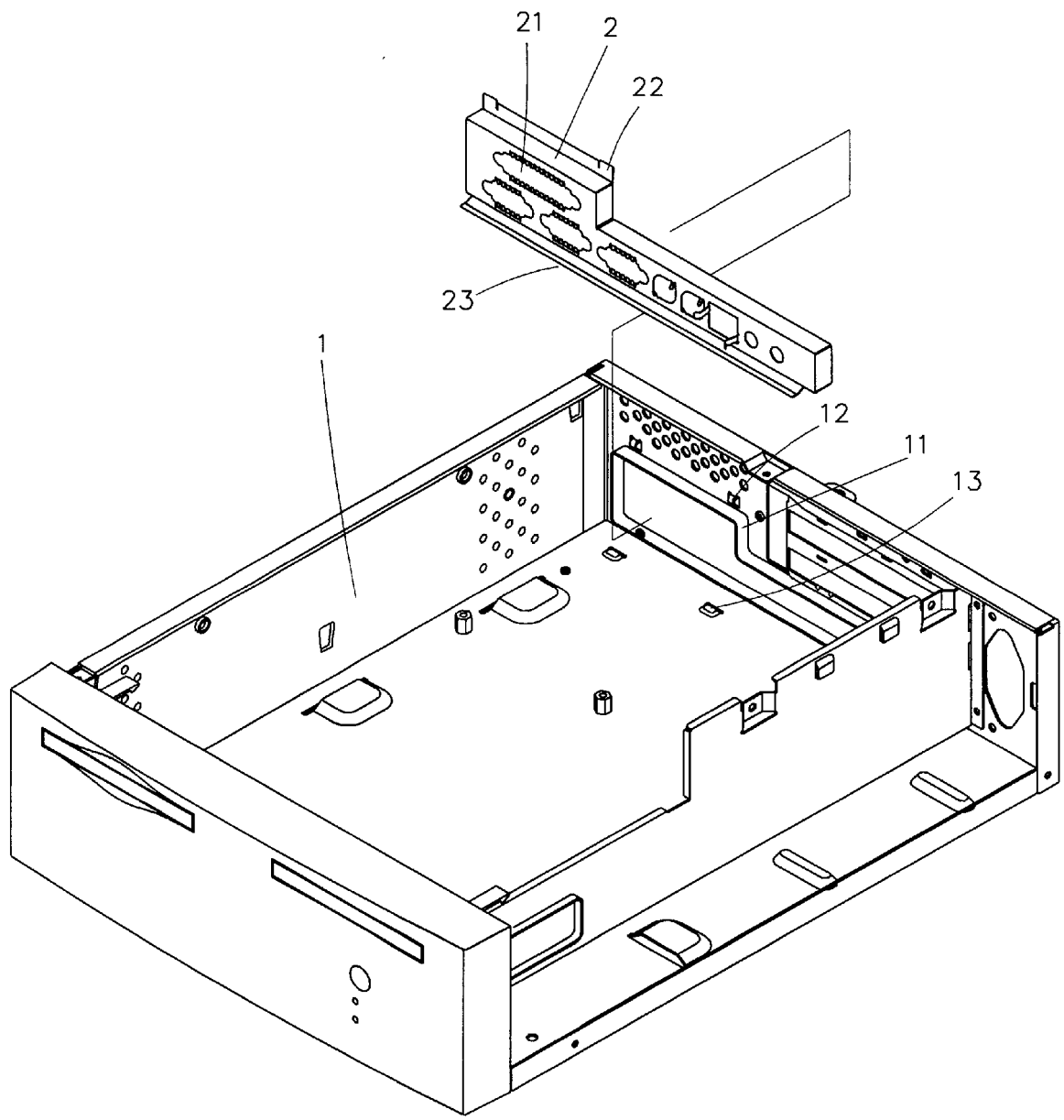
FIG. 1 is an exploded view of a quick release terminal holder mounting arrangement according to the present invention.

Referring to FIG. 1, the casing, referenced by 1, comprises an open frame 11 integral with the upright rear side wall thereof, a plurality of hooks 12 raised from the inner side of the upright rear side wall above the open frame 11, and a plurality of retainer elements 13 raised from the top side of the flat bottom side wall thereof adjacent to the open frame 11. The terminal holder, referenced by 2, fits the open frame 11, comprising a set of terminal slots 21 for holding different terminals, a top flange 22 upwardly raised from the top side thereof, and a bottom flange 23 obliquely forwardly raised from the bottom side thereof.

Figure 2:
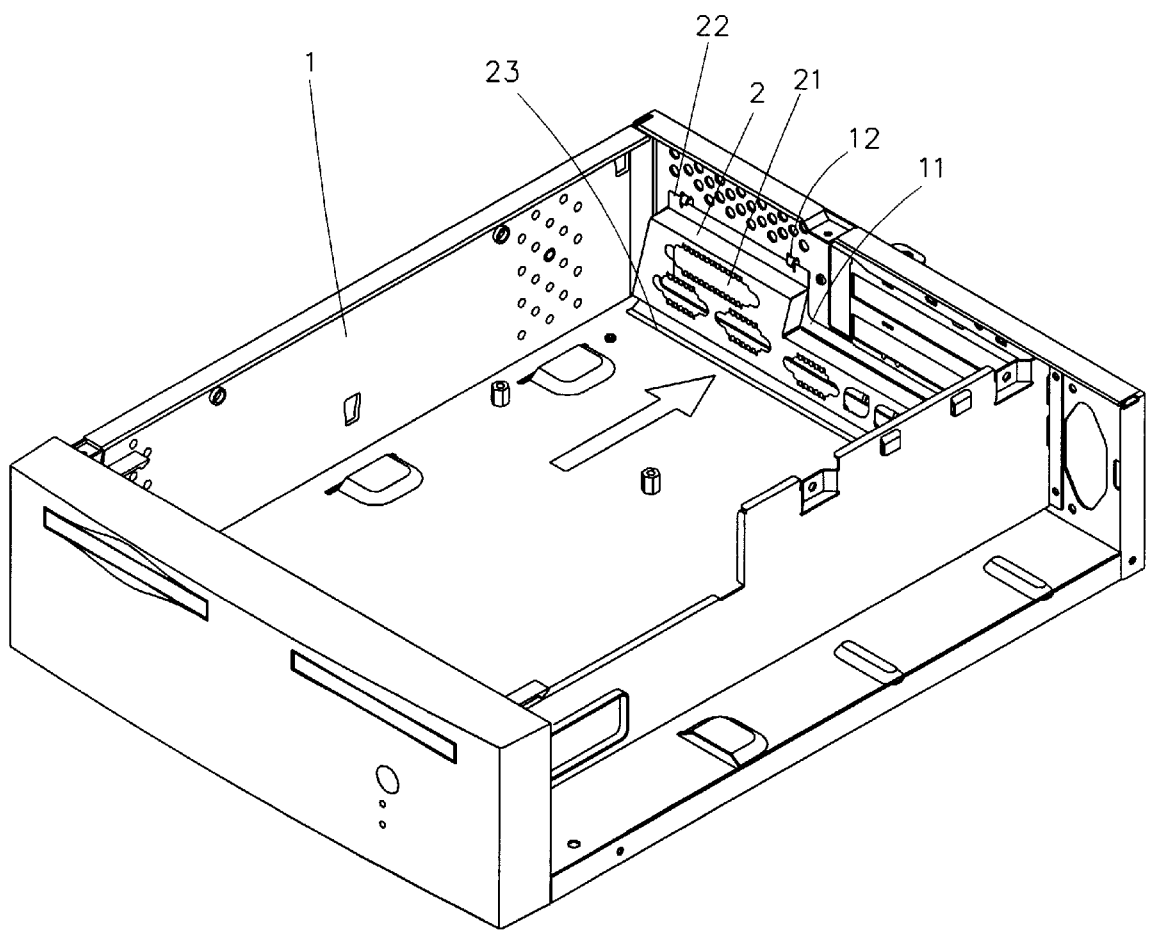
FIG. 2 shows the terminal holder attached to the open frame inside the casing according to the present invention.
Figure 3:
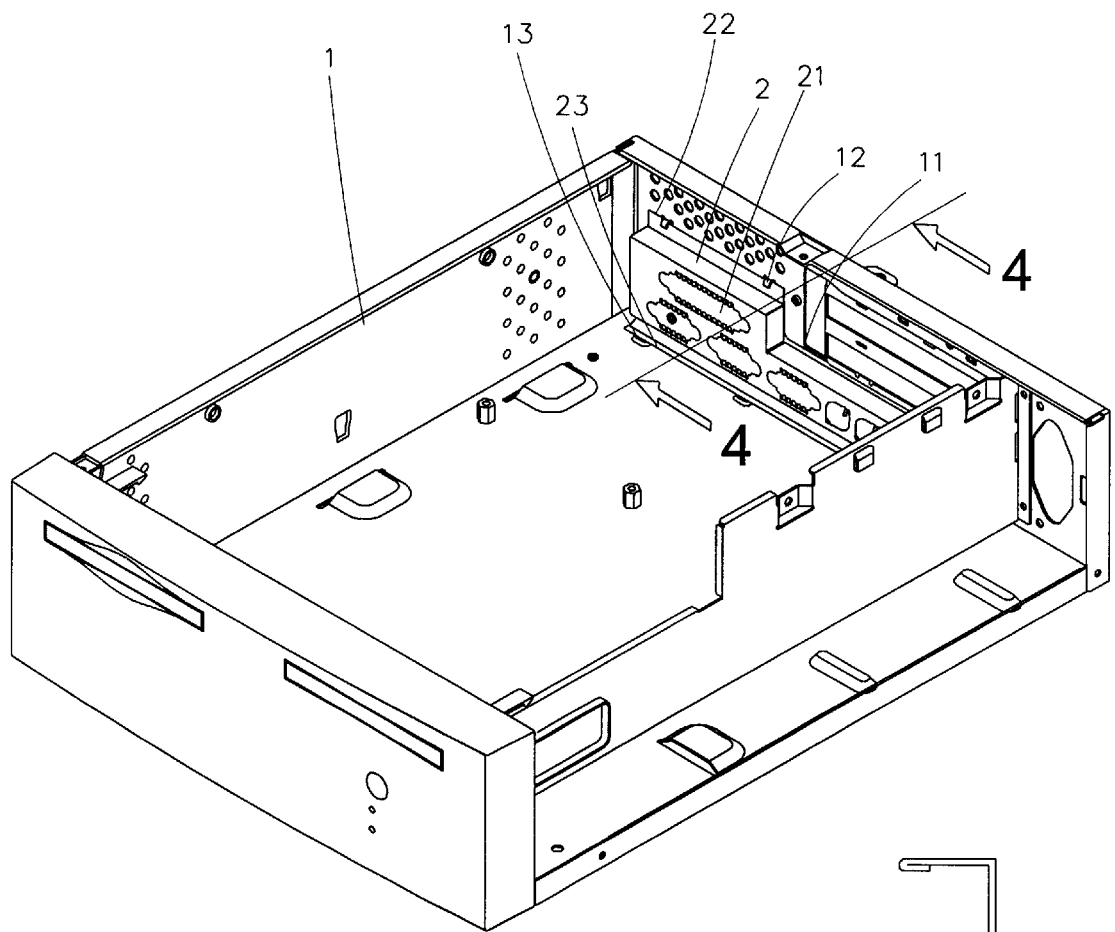
FIG. 3 is similar to FIG. 2 but showing the terminal holder set into position.
Figure 4:
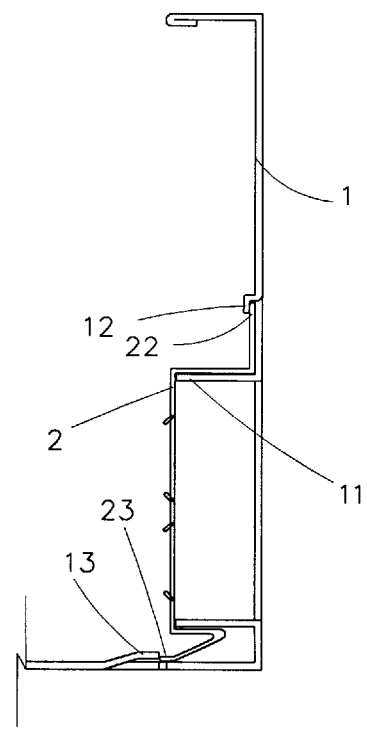
FIG. 4 is a sectional view taken along line 4—4 in FIG. 3 showing the terminal holder retained in position inside the casing.

Referring to FIGS. 2 and 3, the top flange 22 of the terminal holder 2 is forced into engagement with the hooks 12 (see FIG. 2), then the bottom side of the terminal holder 2 is pushed forwards toward the open frame 11, permitting the bottom flange 23 to pass over the retainer elements 13 and then to be stopped from backward movement by the retainer elements 13 (see FIG. 3). When installed, the terminal holder 2 is covered and supported on the open frame 11, and retained firmly in place by the hooks 12 and the retainer elements 13. When dismounting the terminal holder 2 from the casing 1, a rigid member is inserted into a hole (not shown) on the bottom wall of the casing 1 to push the bottom flange 23 away from the constraint of the retainer elements 13 for permitting the terminal holder 2 to be removed from the on frame 11.

What the invention claimed is:

1. A terminal holder mounting system for releasably attaching a terminal holder to a computer housing having a bottom side and a plurality of side walls extending from the bottom side to bound an interior space, the mounting system comprising:
    a) a frame extending into the interior space from one of the plurality of side walls;
    b) at lease one hook extending into the interior space from said one of the plurality of side walls, the at least one hook being spaced from the frame;
    c) at least one retainer extending into the interior space from the bottom side; and,
    d) a terminal holder engaging the frame and having a first flange located so as to engage the at least one hook when the terminal holder is engaged with the frame, and a second flange extending obliquely from the terminal holder and having distal end located so as to bear against the at least one retainer when the terminal holder is engaged with the frame to thereby retain the terminal holder in engagement with the frame.

2. The terminal holder mounting systems of claim 1, wherein the at least one hook opens toward the frame.

3. The terminal holder mounting system of claim 1, further comprising a plurality of hooks extending into the interior space from said one of the plurality of side walls.

4. The terminal holder mounting system of claim 1, further comprising a plurality of retainers extending into the interior space from the bottom side.

* * * * *